United States Patent
Finefrock

(10) Patent No.: US 8,215,162 B2
(45) Date of Patent: Jul. 10, 2012

(54) FOCUSED FIELD ANTENNA FOR PASSIVE RFID TIRE PRESSURE SENSOR TRANSPONDER

(75) Inventor: Mark D. Finefrock, Lake Stevens, WA (US)

(73) Assignee: ELDEC Corporation, Lynnwood, WA (US)

( * ) Notice: Subject to any disclaimer, the term of this patent is extended or adjusted under 35 U.S.C. 154(b) by 35 days.

(21) Appl. No.: 12/843,817

(22) Filed: Jul. 26, 2010

(65) Prior Publication Data

US 2011/0056285 A1 Mar. 10, 2011

Related U.S. Application Data

(60) Provisional application No. 61/228,914, filed on Jul. 27, 2009.

(51) Int. Cl.
  *B60C 23/02* (2006.01)
  *H04Q 5/22* (2006.01)
(52) U.S. Cl. ...................... 73/146.5; 340/10.1
(58) Field of Classification Search .......... 73/146–146.8
  See application file for complete search history.

(56) References Cited

U.S. PATENT DOCUMENTS

| | | |
|---|---|---|
| 4,724,389 A | 2/1988 | Hyde et al. |
| 6,839,035 B1 | 1/2005 | Addonisio et al. |
| 6,889,543 B2 | 5/2005 | Gautier |
| 2004/0178267 A1* | 9/2004 | Tsirline et al. ............. 235/449 |
| 2005/0092838 A1* | 5/2005 | Tsirline et al. ............. 235/449 |
| 2005/0264406 A1 | 12/2005 | Myhre et al. |
| 2008/0042850 A1 | 2/2008 | De Witte et al. |
| 2008/0216567 A1* | 9/2008 | Breed ....................... 73/146.5 |
| 2009/0102731 A1 | 4/2009 | Jow |
| 2010/0066561 A1* | 3/2010 | Ulrich et al. ............ 340/870.07 |
| 2010/0207754 A1* | 8/2010 | Shostak et al. ............. 340/450 |
| 2011/0068912 A1* | 3/2011 | Tollkuehn et al. .......... 340/441 |
| 2011/0111695 A1* | 5/2011 | Shameli et al. ............ 455/41.1 |
| 2011/0133894 A1* | 6/2011 | Hennig et al. ............. 340/10.1 |
| 2011/0193418 A1* | 8/2011 | Hennig et al. ............. 307/104 |

FOREIGN PATENT DOCUMENTS

| | | |
|---|---|---|
| EP | 1632368 A1 | 8/2006 |
| FR | 2909589 A1 | 6/2008 |
| GB | 2405931 A | 3/2005 |

* cited by examiner

*Primary Examiner* — Andre Allen
(74) *Attorney, Agent, or Firm* — Fulwider Patton LLP

(57) ABSTRACT

A passive RFID transponder sensor system includes a sensor assembly having a focused field transponder antenna with a highly magnetically permeable transponder antenna stem, and a reader antenna with an electrical reader coil generating a magnetic field having magnetic flux extending between the reader antenna and a sensor assembly. The electrical transponder coil and the electrical reader coil are coupled by the magnetic field, so that information can be transferred to and from the sensor assembly through the magnetic field by which the electrical transponder coil and the electrical reader coil are coupled.

20 Claims, 4 Drawing Sheets

FOCUSED FIELD ANTENNA FOR PASSIVE RFID TIRE PRESSURE SENSOR TRANSPONDER

CROSS-REFERENCES TO RELATED APPLICATIONS

This application is based upon Provisional Application No. 61/228,914, filed Jul. 27, 2009.

BACKGROUND OF THE INVENTION

This invention relates generally to vehicle tire monitoring systems, and more particularly relates to a system for transmitting power to an aircraft tire pressure sensor from a low frequency (LF) RFID reader for transmitting data between an aircraft tire pressure sensor and the control unit. The invention pertains more specifically to a communication link between a tire pressure sensor on a wheel rim and control electronics connected to a wheel hub or a hand held reader/transponder, particularly adapted to use on aircraft.

It is useful in an airplane to monitor information relating to each tire, such as pressure or temperature information, for example, and provide this information in the cockpit or to flight line tire service personnel. It is necessary to communicate this information from the wheel rim to electronics located on the wheel axle or within the hand held reader/transponder.

One known tire pressure system uses a pair of transformer coils to communicate between a primary and secondary coil in the wheel axle. These transformers are coaxial and face each other. A length of wire connected to the secondary of the transformer pair connects directly with the tire pressure sensor that is located on the periphery of the wheel rim. However, it would be desirable to provide an aircraft tire pressure link for electromagnetically coupling a magnetic field between a wheel hub coil and a tire pressure sensor coil that does not use unreliable electrical connections and does not use wires that are otherwise prone to breakage in the harsh environment of the airplane wheel. It is thus desirable to provide a non-contact method of communication between an airplane wheel hub and a tire pressure sensor located on the rim of the wheel that does not require electrical connections or a length of wire to communicate between the wheel hub and the tire pressure sensor. More specifically, it would be desirable to provide wireless communication between an airplane wheel hub or a hand held reader/transponder and a tire pressure sensing transponder located on the rim of the wheel up to six inches away from the wheel hub or transponder antenna.

RFID antenna concepts are widely known in the form of air-core coils and ferrite rod solenoids. This technology is represented in, e.g., the RFID Handbook, or U.S. Pat. No. 6,839,035 (Addonisio) wherein a magnetic coupling range extension is achieved with a tuned resonant interposer coil. Also known is US 2008/0042850 A1, wherein a hybrid RFID tag includes circuitry that can be positioned within an open area defined by a first antenna, and includes a battery that can be positioned within another area defined by the first antenna.

Much of the prior art applies to high frequency RFID where frequencies are too high to effectively direct flux through highly permeable media (such as high nickel alloy metals) over any useful distance. Low frequency (LF) RFID transponder antennas have typically required that the antenna coils be directly exposed to the magnetic field per Faraday's Law wherein EMF is proportional to the area of the coil that is within the changing magnetic field. This traditional field coupled coil practice results in large area coils to achieve magnetically coupled RFID communication over extended distances.

It would be desirable to provide a low frequency RFID transponder system for use in sensor package systems, such as in a tire pressure sensor system or temperature sensor system, for example, and to allow the use of a low frequency RFID antenna in sensor package systems that have become industry standard prior to RFID technology, without altering the legacy form factor of those sensors. It would be desirable to design the magnetic properties of such sensor package systems to manage magnetic flux path impedances to concentrate and direct magnetic flux through an internal coil of a transponder antenna, and then allow the flux to return from the external surface of the transponder antenna coil to the reader antenna.

The need exists for embedding RFID antennas within sensor packages which would otherwise not be suited for use in an exposed area of an aircraft landing gear, due to the size, shape, and environmental concerns that apply to antenna coils with large cross-sections.

It also would be desirable to provide a range extension for a low frequency RFID transponder sensor system by forming the shape of a magnetic field from a reader antenna of such a low frequency RFID transponder sensor system, and establishing an efficient field pattern pairing between reader and transponder antenna flux paths. It further would be desirable to utilize and optimize the flux directing possibilities that exist in the LF RFID frequency band.

It would also be desirable to provide a low frequency RFID sensor transponder system in which a sensor transponder assembly enclosure is configured to use environmental and structural metal features to also serve a magnetic function which effectively increases the flux collecting area of the coil, permitting the use of smaller sensor transponder coils. It would be desirable for the magnetic flux from an LF RFID transponder antenna to be collected by a magnetically permeable metal on the exterior of the sensor enclosure, and then concentrated and directed by a portion of the same magnetically permeable metal of the sensor enclosure through the center of an electrical wire coil, even when the coil is located within the sensor enclosure. The present invention meets these and other needs.

SUMMARY OF THE INVENTION

Briefly and in general terms, the present invention provides for a passive RFID transponder sensor system, including a focused field transponder antenna having a highly magnetically permeable transponder antenna stem, and a reader antenna with an electrical reader coil generating a magnetic field having magnetic flux extending from the reader antenna to the sensor assembly. The electrical sensor transponder coil and the electrical reader coil are coupled by the magnetic field, so that information can be transferred to and from the sensor assembly through the magnetic field by which the electrical transponder coil and the electrical reader coil are coupled.

By the present invention, EMF in the sensor transponder coil is achieved using smaller coils which are configured to use their environmental and structural enclosure metal features to also serve a second magnetic function which effectively increases the flux collecting area of the coil. The magnetic flux from an LF RFID transponder antenna can be collected by a magnetically permeable metal on the exterior of the sensor enclosure, and that flux is then concentrated and directed by a portion of that same magnetically permeable metal through the center of an electrical wire coil having substantially any desired cross-sectional area, even when that coil is located within the enclosure of the sensor. As with conventional ferrite core type transponder antennas, the length of their core increases the flux coupling distance for the transponder, but the present invention advances the art by accomplishing that same coupling range extension using the sensor enclosure in a dual function to also perform the flux collection and concentration function without addition of a separate ferrite core.

The present invention accordingly provides for a passive RFID transponder sensor system, including an electronic sensor device and a transponder antenna. The transponder antenna includes an electrical transponder coil electrically connected to the electronic sensor device, and an enclosure formed of a magnetically permeable metal within which the electrical transponder coil is disposed. The enclosure includes a transponder antenna stem having a top portion with an exterior side configured to receive a magnetic flux entering the transponder antenna stem, and the enclosure includes a portion configured to concentrate and direct the magnetic flux through the electrical transponder coil.

In a presently preferred aspect, the electronic sensor device is disposed in the enclosure. In another presently preferred aspect, the enclosure includes a flux return surface, which is preferably spaced apart from the top portion of the transponder antenna stem. In another presently preferred aspect, the electronic sensor device comprises an electronic pressure sensor device, the sensor assembly includes an interior air pressure sensor passage, and the electronic pressure sensor device is connected through the interior air pressure sensor passage for sensing air pressure.

In another presently preferred aspect, the passive RFID transponder sensor system can include a reader antenna including an electrical reader coil for generating a magnetic field including the magnetic flux, with the magnetic flux extending from an exterior edge of the reader antenna to the transponder antenna, so that the electrical transponder coil and the electrical reader coil are coupled by the magnetic field, whereby information can be transferred to and from the sensor assembly through the magnetic field by which the electrical transponder coil and the electrical reader coil are coupled.

The transponder antenna includes an electrical transponder coil electrically connected to the electronic sensor device, and advantageously includes a highly magnetically permeable transponder antenna stem that focuses the magnetic field, so that the magnetic flux is concentrated and directed through the internal transponder coil, and then allows the flux to return from the external surface of the transponder antenna to the reader antenna. In a presently preferred aspect, the transponder antenna stem includes a top portion having an exterior side through which magnetic flux enters, and may include an exterior stacking shelf. In another presently preferred aspect, the transponder antenna stem includes a flux return surface spaced apart from the exterior stacking shelf by a low loss, non-permeable coil bobbin retainer, and the electrical transponder coil is disposed within an interior space in the coil bobbin retainer.

In another presently preferred aspect, the electronic sensor device is an electronic pressure sensor device, the sensor assembly includes an interior air pressure sensor passage, and the electronic pressure sensor device is connected through the interior air pressure sensor passage for sensing air pressure. In another presently preferred aspect, the reader antenna includes a reader extension arm, which can be formed of a magnetically permeable metal structure. In another presently preferred aspect, the transponder antenna is a low frequency RFID transponder system.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
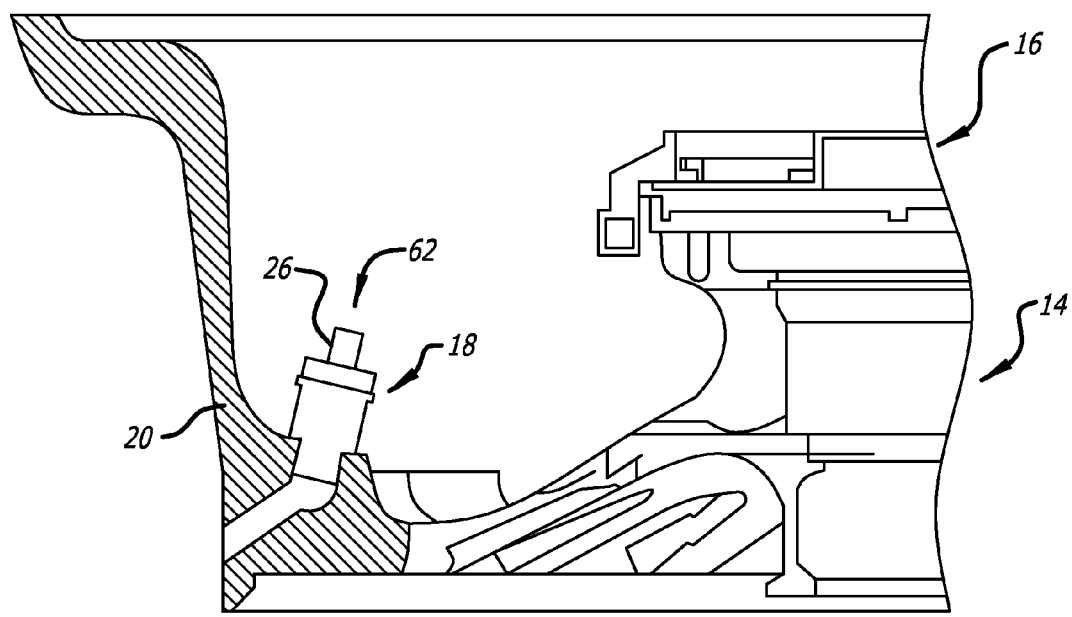
FIG. 1 is a partial sectional view illustrating the mounting of passive RFID transponder sensor system according to the invention in an aircraft wheel electromagnetically connecting a wheel hub to a tire pressure sensor.
Figure 2:
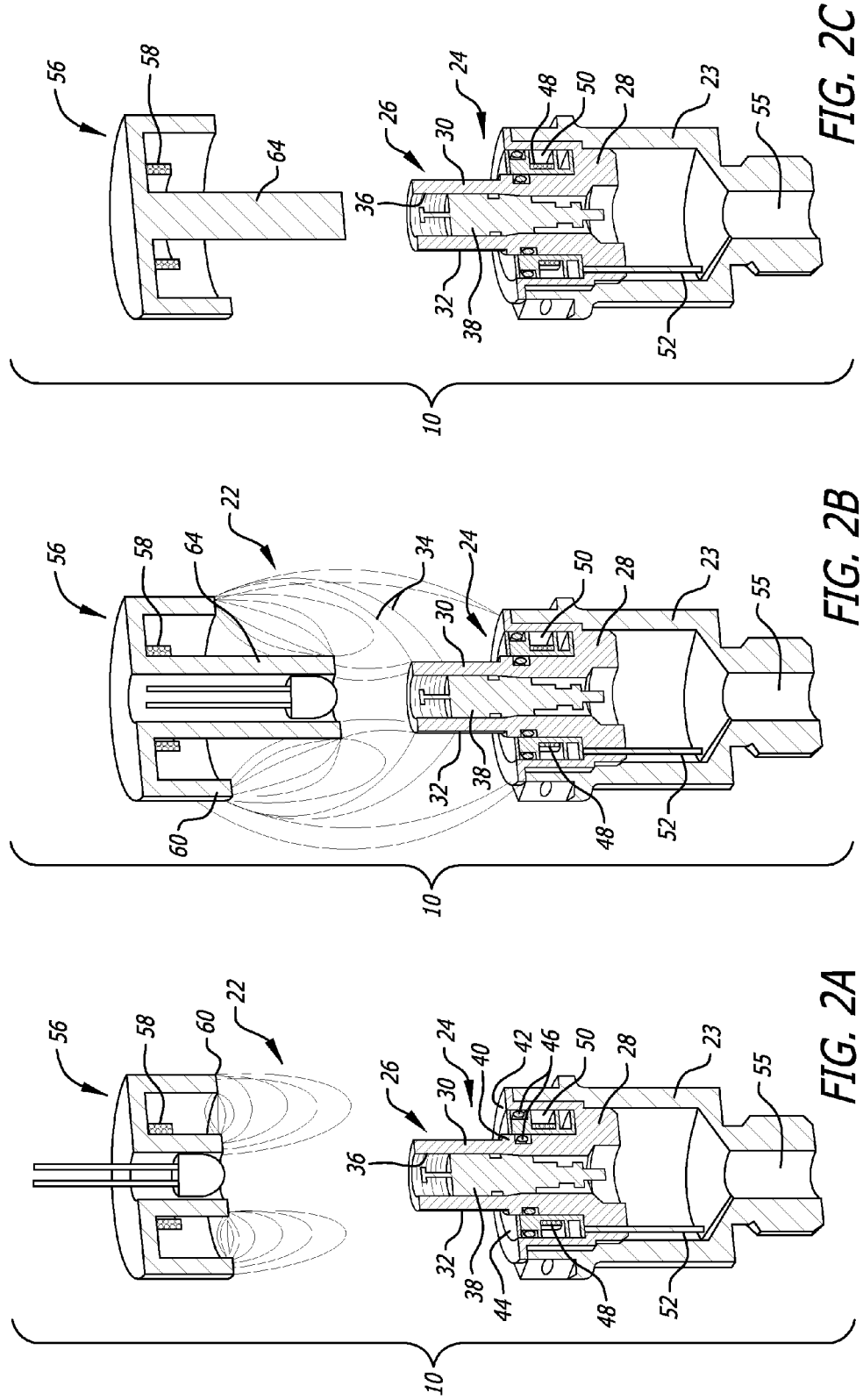
FIG. 2A is a schematic sectional diagram of a LF RFID magnetic field reader/transponder pair according to the present invention, and illustrating the propagation of magnetic flux lines.
FIG. 2B is a schematic sectional diagram of a first variation of the LF RFID magnetic field reader/transponder pair of FIG. 2A including a first variation of the LF RFID magnetic field reader, according to the present invention, and illustrating the propagation of magnetic flux lines.
FIG. 2C is a schematic sectional diagram of another variation of the LF RFID magnetic field reader/transponder pair of FIG. 2A including another variation of the LF RFID magnetic field reader, according to the present invention.
Figure 3:
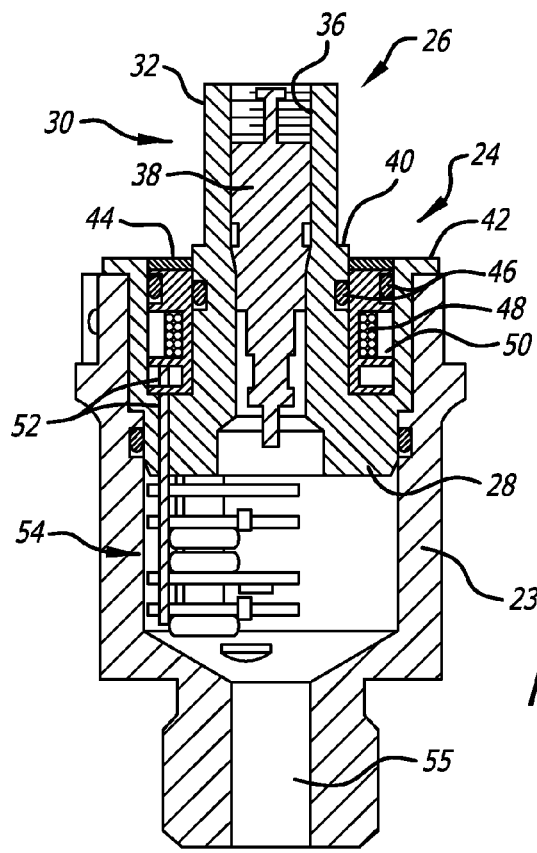
FIG. 3 is a schematic sectional diagram of the LF RFID magnetic field transponder of FIGS. 2A-2C, according to the present invention
Figure 4:
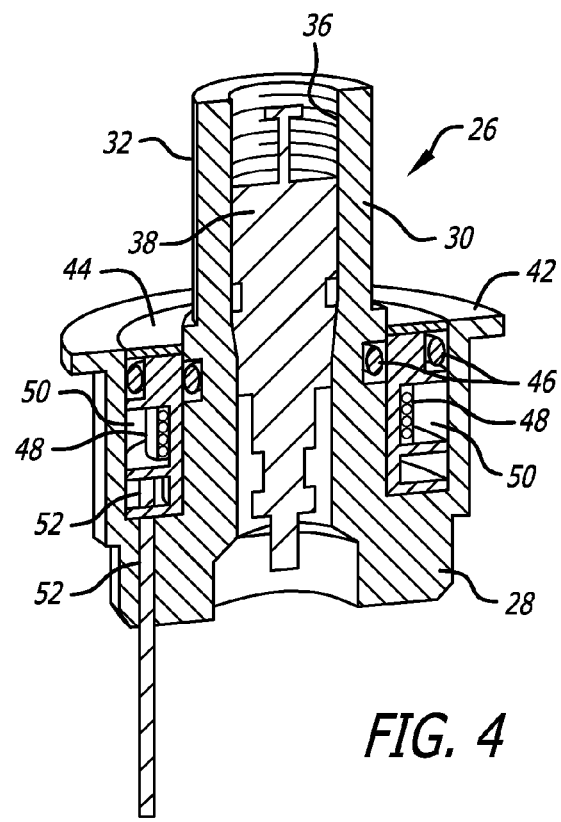
FIG. 4 is an enlarged cross-sectional diagram of a portion of the LF RFID transponder of FIG. 3.

Referring to the drawings, which are provided by way of example, and not by way of limitation, the present invention provides for a metal tire sensor and monitoring system, such as a tire pressure sensor (TPS) and monitoring system, for example, adapted for use in an airplane wheel. Referring to FIGS. 1 and 2A-2C, a tire pressure monitor system 10 was developed in which an electronics unit (not shown), typically located in the hub 14 of a wheel 16 of an aircraft, or in a hand held reader/transponder (not shown), for example, communicates with an electronic sensor device, such as a tire pressure sensor (TPS) assembly 18 near the wheel rim 20 of the wheel, using a magnetic field 22.

As is illustrated in FIG. 2A to FIG. 4, the tire pressure sensor assembly includes a sensor housing 23 including an enclosure 24 formed of a highly magnetically permeable metal, and having a highly magnetically permeable transponder antenna extension arm or stem 26 providing a length of thin and highly permeable multilayer and laminated metal structure 28. The highly magnetically permeable TPS stem includes a top portion 30 having an exterior side 32 through which magnetic flux 34 enters, as will be further explained below.

The stem also typically includes central interior threaded channel 36 and a standard fill stem valve core 38. The stem also typically includes an exterior stacking shelf or shoulder 40 formed near a flux return surface 42 of the stem, spaced apart from the exterior stacking shelf or shoulder by a low loss, non-permeable coil bobbin retainer 44, such as an aluminum bobbin retainer, for example. The coil bobbin retainer includes pressure seals 46, such as elastic O-ring seals, for example.

An electrical transponder coil 48 is disposed within the enclosure in an interior space 50, and is connected by insulated coil terminals 52 to an electronic pressure sensor device 54 (illustrated in FIG. 3) connected through an interior air pressure sensor passage 55 that extends through the sensor housing and wheel rim to the interior of a tire (not shown) that would be mounted on the wheel rim, for sensing air pressure within the tire.

A wheel hub coil, interrogator, reader or reader antenna 56 typically located on the hub of the wheel includes an electrical reader coil 58 that produces the magnetic field. Magnetic flux of the magnetic field from the edge 60 of the wheel hub coil is coupled out to the transponder coil of the tire pressure sensor at the periphery 62 of the wheel rim where the transponder coil of the tire pressure sensor is located, using the length of thin and highly permeable multilayer and laminated metal structure. Flux enters the exterior side of the top of the highly magnetically permeable TPS stem, and is straightened for passing through the transponder coil of the tire pressure sensor. In this manner, a magnetic field collection area can be provided by the tire pressure sensor assembly, and information can be transferred to and from the tire pressure sensor through the magnetic field by which the two coils are coupled.

Referring to FIG. 2A, the transponder antenna coil can be very flat, such as would be fabricated on a printed on a printed wiring board (PWB), but the coil itself does not need to have a large diameter for field collection. The low profile coil of the transponder antenna allows for shorter magnetic flux path back to the wheel hub coil, or interrogator, reader or reader antenna coil, which increases the communication range proportionally. As is illustrated in FIGS. 2B and 2C, the reader antenna coil can include a reader extension arm or stem 64 providing a length of a magnetically permeable metal structure.

Figure 5:
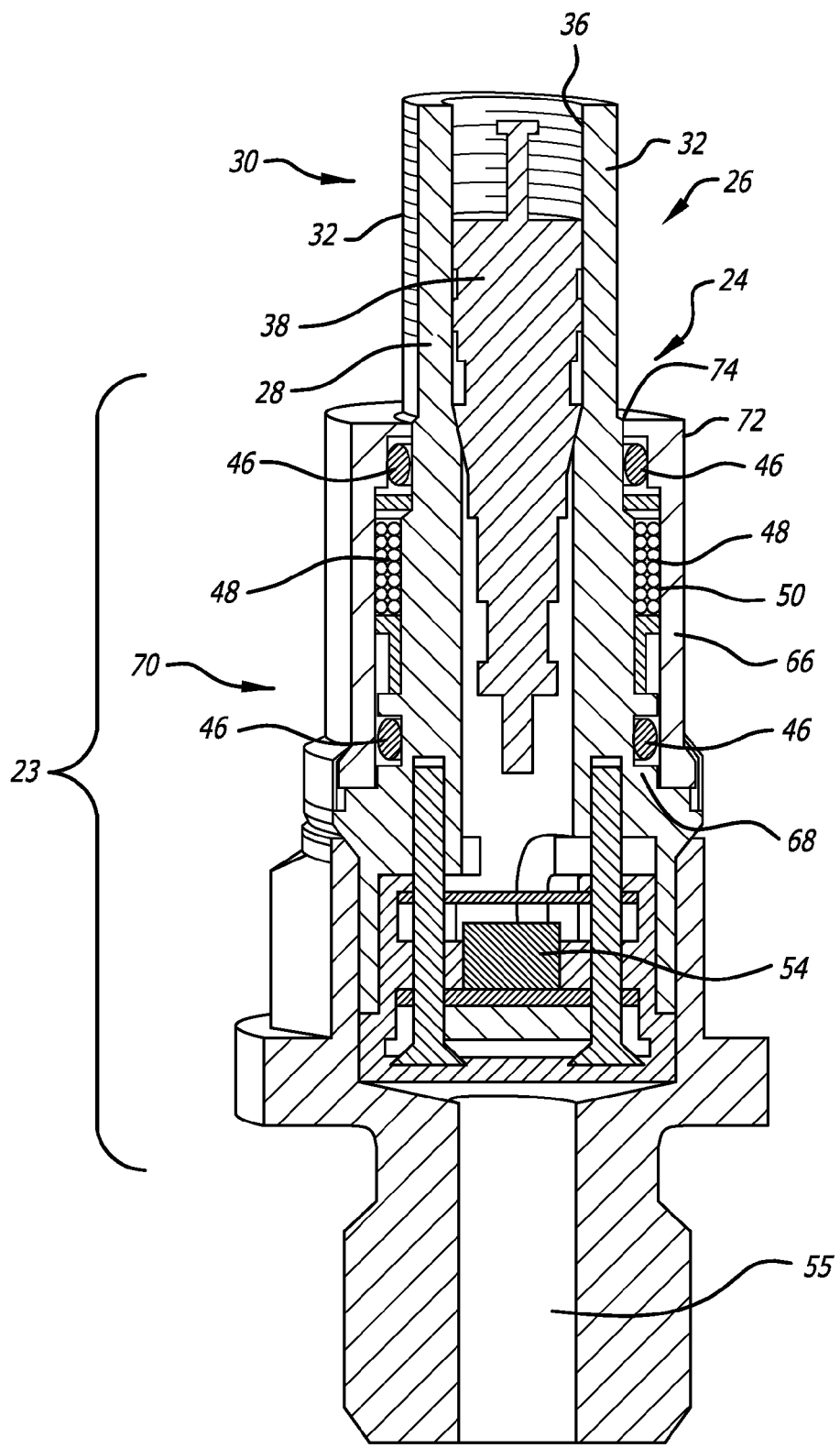
FIG. 5 is a schematic sectional diagram of a variation of the LF RFID magnetic field transponder shown in FIG. 3.

In a variation of the tire pressure sensor assembly of FIG. 2A to FIG. 4, illustrated in FIG. 5, in which like reference numbers refer to like elements, the tire pressure sensor assembly includes a sensor housing 23 including an enclosure 24 formed of a highly magnetically permeable metal, and having a highly magnetically permeable transponder antenna extension arm or stem 26 providing a length of thin and highly permeable multilayer and laminated metal structure 28. The highly magnetically permeable TPS stem includes a top portion 30 having an exterior side 32 through which magnetic flux enters, as discussed above.

The stem also typically includes central interior threaded channel 36 and a standard fill stem valve core 38. The enclosure also includes an exterior flux return member 66 formed of a highly magnetically permeable metal disposed radially outwardly around the transponder antenna extension arm or stem, and is connected in magnetic communication with a base portion 68 of the highly permeable multilayer and laminated metal structure of the transponder antenna extension arm or stem. An upper portion 70 of the exterior flux return member adjacent to the top portion of the transponder antenna extension arm or stem provides a flux return surface 72, which is spaced apart from the top portion of the transponder antenna extension arm or stem by an air gap 74, for example. The flux return member also acts as a pressure vessel and a cover clamp. Pressure seals 46, such as elastic O-ring seals, for example, are provided between the exterior flux return member and the transponder antenna extension arm or stem.

An electrical transponder coil 48 is disposed within the enclosure in an interior space 50 defined between the exterior flux return member and the transponder antenna extension arm or stem, and is connected by insulated coil terminals (not shown) to an electronic pressure sensor device 54 connected through an interior air pressure sensor passage 55 that extends through the sensor housing and wheel rim to the interior of a tire (not shown) that would be mounted on the wheel rim, for sensing air pressure within the tire. The magnetic flux coupling loop extends from the reader coil, through the transponder antenna extension arm or stem, through the electrical transponder coil, and from the flux return surface area to the reader coil to form the magnetic flux coupling loop with the reader coil.

The present invention adapts a low frequency (LF) RFID transponder system for use in a tire pressure or temperature sensor. This invention enables LF RFID antenna to be designed into sensor package systems that have become industry standard prior to RFID technology, and without altering the legacy form factor of those sensors. By the concepts of this invention, the magnetic properties of those package materials are designed to manage magnetic flux path impedances to concentrate and direct the flux through an internal coil and then allow the flux to return from the external surface of the transponder to the reader antenna. The invention disclosed herein is unique in that the range extension is a result of forming the magnetic field shape by means of the reader antenna, and establishing a efficient field pattern pairing between reader and transponder antenna flux paths.

By the foregoing, it has been demonstrated that the present invention provides for a passive RFID transponder sensor system that can collect magnetic flux from an LF RFID transponder antenna by a magnetically permeable metal on the exterior of the sensor enclosure, and that can concentrate and direct the collected magnetic flux by a portion of the magnetically permeable metal structure through an electrical wire coil disposed within the enclosure of the sensor. The present invention thus allows for the use of smaller coils and an increase in the flux collecting area of the coils in the passive RFID transponder sensor system.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A passive RFID transponder sensor system providing a transponder antenna serving a dual function of housing, a transponder sensor and increasing magnetic flux collecting area of the RFID transponder sensor system, comprising:
    an electronic sensor device; and
    a transponder antenna, including an electrical transponder coil electrically connected to said electronic sensor device, said transponder antenna including an enclosure formed of a magnetically permeable metal within which said electrical transponder coil is disposed, said enclosure including a transponder antenna stem having a top portion with an exterior side configured to receive a magnetic flux entering said transponder antenna stem, and said enclosure including a portion configured to concentrate and direct said magnetic flux through said electrical transponder coil, whereby said enclosure of said transponder antenna houses said electronic sensor device and increases magnetic flux collecting area of the RFID transponder sensor system.

2. The passive RFID transponder sensor system of claim 1, wherein said electronic sensor device is disposed in said enclosure.

3. The passive RFID transponder sensor system of claim 1, wherein said enclosure comprises a flux return surface.

4. The passive RFID transponder sensor system of claim 1, wherein said flux return surface is spaced apart from said top portion of said transponder antenna stem.

5. The passive RFID transponder sensor system of claim 1, wherein said transponder antenna stem comprises an exterior stacking shelf.

6. The passive RFID transponder sensor system of claim 5, wherein said transponder antenna comprises a low loss, non-permeable coil bobbin retainer disposed within said enclosure, and said transponder antenna stem includes a flux return surface spaced apart from said exterior stacking shelf by said low loss, non-permeable coil bobbin retainer.

7. The passive RFID transponder sensor system of claim 1, wherein said electronic sensor device comprises an electronic pressure sensor device, said sensor assembly includes an interior air pressure sensor passage, and said electronic pressure sensor device is connected through said interior air pressure sensor passage for sensing air pressure.

8. The passive RFID transponder sensor system of claim 1, further comprising a reader antenna having an exterior edge, said reader antenna including an electrical reader coil for generating a magnetic field including said magnetic flux, said magnetic flux extending from the exterior edge of the reader antenna to the transponder antenna, said electrical transponder coil and said electrical reader coil being coupled by said magnetic field.

9. The passive RFID transponder sensor system of claim 8, wherein said reader antenna comprises a reader extension arm.

10. The passive RFID transponder sensor system of claim 9, wherein said reader extension arm is formed of magnetically permeable metal structure.

11. The passive RFID transponder sensor system of claim 1, wherein said transponder antenna comprises a low frequency RFID transponder system.

12. A passive RFID transponder tire monitoring system providing a transponder antenna serving a dual function of housing, a transponder sensor and increasing magnetic flux collecting area of the RFID transponder sensor system, comprising:

a sensor assembly, including an electronic sensor device and a sensor transponder antenna, said sensor transponder antenna including an electrical transponder coil electrically connected to said electronic sensor device, said transponder antenna including an enclosure formed of a magnetically permeable metal within which said electrical transponder coil is disposed, said enclosure including a transponder antenna stem having a top portion with an exterior side configured to receive a magnetic flux entering said transponder antenna stem, and said enclosure including a portion configured to concentrate and direct said magnetic flux through said electrical transponder coil, whereby said enclosure of said transponder antenna houses said electronic sensor device and increases magnetic flux collecting area of the RFID transponder sensor system; and a reader antenna having an exterior edge, said reader antenna including an electrical reader coil for generating a magnetic field providing said magnetic flux, said magnetic flux extending from the exterior edge of the reader antenna to the sensor assembly, said electrical transponder coil and said electrical reader coil being coupled by said magnetic field.

13. The passive RFID transponder tire monitoring system of claim 12, wherein said enclosure comprises a flux return surface.

14. The passive RFID transponder tire monitoring system of claim 12, wherein said transponder antenna stem comprises an exterior stacking shelf.

15. The passive RFID transponder tire monitoring system of claim 14, wherein said transponder antenna comprises a low loss, non-permeable coil bobbin retainer disposed within said enclosure, and said transponder antenna stem includes a flux return surface spaced apart from said exterior stacking shelf by said low loss, non-permeable coil bobbin retainer.

16. The passive RFID transponder tire monitoring system of claim 15, wherein said electrical transponder coil is disposed within an interior space in said coil bobbin retainer.

17. The passive RFID transponder tire monitoring system of claim 12, wherein said electronic sensor device comprises an electronic tire air pressure sensor device, said sensor assembly includes an interior air pressure sensor passage, and said electronic tire air pressure sensor device is connected through said interior air pressure sensor passage for sensing tire air pressure.

18. The passive RFID transponder tire monitoring system of claim 12, wherein said reader antenna comprises a reader extension arm.

19. The passive RFID transponder tire monitoring system of claim 18, wherein said reader extension arm is formed of a magnetically permeable metal structure.

20. The passive RFID transponder tire monitoring system of claim 12, wherein said transponder antenna comprises a low frequency RFID transponder system.

* * * * *